United States Patent
Hirai (10) Patent No.: US 7,961,245 B2
(45) Date of Patent: Jun. 14, 2011

(54) IMAGE SURFACE ILLUMINANCE VARYING APPARATUS, EXPOSURE CORRECTING APPARATUS, AND EXPOSURE CORRECTING METHOD

(75) Inventor: Isamu Hirai, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/545,999

(22) Filed: Aug. 24, 2009

(65) Prior Publication Data

US 2009/0309993 A1 Dec. 17, 2009

Related U.S. Application Data

(62) Division of application No. 11/333,198, filed on Jan. 18, 2006, now abandoned.

(30) Foreign Application Priority Data

Jan. 20, 2005 (JP) .................................. 2005-013327
Jun. 9, 2005 (JP) .................................. 2005-169787

(51) Int. Cl.
*H04N 5/232* (2006.01)
*H04N 5/225* (2006.01)
*H04N 5/262* (2006.01)
*H04N 5/235* (2006.01)

(52) U.S. Cl. ...................... 348/345; 348/335; 348/240.3; 348/229.1

(58) Field of Classification Search .................. 348/345, 348/335, 240.3, 229.1
See application file for complete search history.

(56) References Cited

U.S. PATENT DOCUMENTS

| 3,981,565 A | 9/1976 | Karasawa |
| 6,754,008 B1 | 6/2004 | Wallerstein et al. |
| 7,019,917 B2 * | 3/2006 | Sato et al. ................... 359/704 |
| 2003/0235410 A1 * | 12/2003 | Kurosawa ................... 396/109 |

FOREIGN PATENT DOCUMENTS

| JP | 2004-184708 | 2/2004 |
| JP | 2004-258494 | 9/2004 |

OTHER PUBLICATIONS

English language Abstract of JP 2004-258494, Sep. 16, 2004.

* cited by examiner

*Primary Examiner* — James M Hannett
(74) *Attorney, Agent, or Firm* — Greenblum & Bernstein, P.L.C.

(57) ABSTRACT

An image surface illuminance varying apparatus includes a variable power optical system in which the optical power thereof can be varied by changing a relative position of a plurality of optical elements thereof; and a light-quantity ratio varying optical element whose transmittance varies in a direction perpendicular to an optical axis of the variable power optical system, the light-quantity ratio varying optical element being located in a light path of the variable power optical system to reduce an illuminance difference of an imaging surface. A distance from the light-quantity ratio varying optical element, which is moved along the optical axis, to a diaphragm or a shutter is varied in accordance with the power varying operation.

9 Claims, 9 Drawing Sheets

IMAGE SURFACE ILLUMINANCE VARYING APPARATUS, EXPOSURE CORRECTING APPARATUS, AND EXPOSURE CORRECTING METHOD

CROSS-REFERENCE TO RELATED APPLICATION

THIS APPLICATION IS A DIVISIONAL OF U.S. patent application Ser. No. 11/333,198, FILED Jan. 18, 2006, AND WHICH CLAIMS PRIORITY TO JAPANESE APPLICATION NOS. 2005-13327, FILED Jan. 20, 2005, AND 2005-169787, FILED Jun. 9, 2005, THE CONTENTS OF WHICH ARE EXPRESSLY INCORPORATED BY REFERENCE HEREIN IN THEIR ENTIRETY.

BACKGROUND OF THE INVENTION

1. Field of the Invention

The present invention relates to an image surface illuminance varying apparatus, an exposure correcting apparatus and an exposure correcting method, for a photographing apparatus, such as a single lens reflex camera or a compact camera, having an optical element whose transmittance varies depending on the position at which light is transmitted through the optical element provided in a photographing optical system thereof.

2. Description of the Related Art

Generally, in a lens of a camera, a light-quantity ratio (illuminance ratio/specific image surface illuminance) between a central portion and a peripheral portion of an image surface is increased toward the wide-angle side (short focal length side). Namely, the illuminance at the central portion of the image surface is high and the illuminance of the peripheral portion thereof is low. In an ultra wide-angle lens, since the light-quantity ratio is very high, it is known for a correction filter to be used to reduce the light-quantity ratio. The correction filter has a transmittance which is continuously varied (gradation) from the paraxial area (center portion) of the filter toward the peripheral portion thereof. The transmittance of the filter in the paraxial area is smaller than that at the peripheral area. If the correction filter is used in an ultra wide-angle lens, the light-quantity ratio between the central portion and the peripheral portion of the image surface is reduced (see Reference No. 1: Japanese Unexamined Publication No. 2004-258494).

In a single lens reflex camera or a compact camera having such a correction filter, the exposure is determined basically in accordance with a photometering measurement (brightness) of an object to thereby determine the diaphragm value and/or shutter speed. The combination of the diaphragm value and the shutter speed always abides by a specific law. For example, according to the APEX system, the exposure Ev, the diaphragm value Av and the shutter speed Tv abide by the following formula:

$$Ev = Av + Tv$$

However, if a correction filter is used with a zoom lens, the zoom lens of a camera exhibits, in general, a large light-quantity ratio (illuminance difference) between the central portion and the peripheral portion of the image surface at a wide-angle (short focal length) and the light-quantity ratio is decreased toward the telephoto side (long focal length). Therefore, in a known light-quantity ratio varying device, the correction in the quantity of light depends considerably on the focal length which is varied during the zooming operation.

In a photographing lens having an optical element whose transmittance varies depending on the position at which light is transmitted through the optical element, a change of the image surface illuminance is not linear with respect to a change in a control diaphragm value. Consequently, if combinations of the control diaphragm value Av and the shutter speed Tv obtained by calculation provide the same light quantity (exposure Ev), the actual light quantities could be different when the control diaphragm value Av corresponds to the open stop (minimum Av) compared to when the control diaphragm value corresponds to the minimum stop (maximum Av). Moreover, in case of a zoom lens, the image surface average illuminance can vary during the zooming operation depending on the position of the optical element, whose transmittance varies depending on the position at which light is transmitted therethrough. In this case, the actual light quantity may differ from the calculated light quantity (exposure Ev) depending on the control diaphragm value.

SUMMARY OF THE INVENTION

The present invention eliminates the drawbacks of the prior art photographing apparatus, having an optical element such as a lens or a correction filter whose transmittance varies depending on the positions at which the light is transmitted therethrough, by providing an image surface illuminance varying apparatus in which the quantity of light can be appropriately corrected in accordance with a change in focal length.

The present invention provides an exposure correcting apparatus and an exposure correcting method in which a difference (error) between the calculated exposure the actual exposure which varies in accordance with the actual diaphragm value and focal length can be corrected.

According to an aspect of the present invention, an image surface illuminance varying apparatus including a variable power optical system in which the optical power thereof can be varied by changing a relative position of a plurality of optical elements thereof; and a light-quantity ratio varying optical element whose transmittance varies in a direction perpendicular to an optical axis of the variable power optical system, the light-quantity ratio varying optical element being located in a light path of the variable power optical system to reduce an illuminance difference of an imaging surface. A distance from the light-quantity ratio varying optical element, which is moved along the optical axis, to a diaphragm or a shutter is varied in accordance with the power varying operation.

It is desirable for the light-quantity ratio varying optical element to have a transmittance which is increased in a radial direction perpendicular to the optical axis.

It is desirable for the light-quantity ratio varying optical element to be moved toward the diaphragm or shutter when the optical power is varied toward the long focal length side, and for the light-quantity ratio varying optical element to be moved away from the diaphragm or shutter when the optical power is varied toward the short focal length side, in association with the power varying operation of the variable power optical system.

It is desirable for the light-quantity varying optical element to be moved together with an optical element located in front of the diaphragm or shutter in accordance with the power varying operation, and wherein the optical element in which the light-quantity ratio varying optical element is provided is moved along a moving path different from that of an optical element which is moved together with the diaphragm or shutter.

It is desirable for the light-quantity ratio varying optical element to include one lens element of a plurality of lens elements which constitute the variable power optical system.

It is desirable for an object light bundle which passes through the variable power optical system and forms a central image to be transmitted through a paraxial area of the light quantity varying optical element, and an object light bundle which passes through the variable power optical system and forms a peripheral image to be transmitted through the peripheral area of the light-quantity ratio varying optical element. The object light bundle forming the peripheral image is transmitted through a peripheral area far away from the paraxial area on the short focal length side and through a peripheral area close to the paraxial area on the long focal length side, respectively.

In an embodiment, an exposure correcting apparatus for a photographing apparatus is provided, including a photometer; an optical element whose transmittance varies depending on the position at which light is transmitted therethrough, provided in a photographing optical system; a diaphragm; and a controller that corrects an exposure. The controller determines an appropriate exposure based on a photometering measurement of the photometer to set a control diaphragm value, wherein the appropriate exposure is obtained in accordance with the quantity of light transmitted through the optical element which is moved in accordance with the set the control diaphragm value.

It is desirable for an amount of exposure correction corresponding to the control diaphragm value to be predetermined and stored in a memory.

It is desirable for the photographing apparatus to be provided in a camera body having a detachable photographing lens, and an amount of exposure correction corresponding to the control diaphragm value is predetermined and stored in a memory provided in the photographing lens.

In an embodiment, an exposure correcting apparatus for a photographing apparatus is provided, including a zoom lens with an optical element whose transmittance varies depending on the position at which light is transmitted therethrough; and a controller for correcting an exposure in accordance with a quality of light transmitted through the optical element which is moved in accordance with a change in a focal length of the zoom lens.

It is desirable for an amount of exposure correction corresponding to the focal length to be predetermined and stored in a memory.

It is desirable for the photographing apparatus to be provided in a camera body to which the zoom lens is detachably attached, and wherein an amount of the exposure correction corresponding to the focal length is predetermined and stored in a memory provided in the zoom lens.

In an embodiment, an exposure correcting apparatus for a photographing apparatus is provided, including a photometer; a zoom lens having an optical element whose transmittance varies depending on the position at which light is transmitted therethrough, provided in a photographing optical system of the photographing apparatus; and a controller for correcting an exposure so that an appropriate exposure is obtained in accordance with a quantity of light transmitted through the optical element which is moved in accordance with a control diaphragm value set based on a photometering measurement by the photometer and the quantity of light transmitted through the optical element which is moved in accordance with a change in a focal length of the zoom lens.

It is desirable for an amount of exposure correction corresponding to a focal length of the photographing optical system and an amount of exposure correction corresponding to the control diaphragm value to be predetermined and stored in a memory.

It is desirable for the photographing apparatus to be provided in a camera body to which the zoom lens is detachably attached, and for an amount of exposure correction corresponding to the focal length and an amount of exposure correction corresponding to the control diaphragm value to be predetermined and stored in a memory provided in the zoom lens.

When the exposure is corrected, it is desirable for a shutter speed to be controlled without correcting the control diaphragm value.

It is desirable for the photographing optical system to include a variable power optical system in which the optical power thereof can be varied, and for the optical element to include a light-quantity ratio varying optical element whose transmittance varies in a direction perpendicular to an optical axis of the variable power optical system, the light-quantity ratio varying optical element being located in the light path of the variable power optical system and varies a distance from a diaphragm or a shutter which is moved along the optical axis in accordance with the power varying operation.

It is desirable for the zoom lens to include a variable power optical system in which the optical power can be varied by changing a relative position of a plurality of optical elements. The optical element includes a light-quantity ratio varying optical element whose transmittance varies in a direction perpendicular to an optical axis of the variable power optical system, the light-quantity ratio varying optical element being located in an optical element which is provided in the light path of the variable power optical system and which varies a distance from a diaphragm or a shutter which is moved along the optical axis in accordance with the power varying operation.

It an embodiment, an exposure correcting method is provided, for a photographing apparatus having a photometer, an optical element whose transmittance varies depending on the position at which light is transmitted therethrough, provided in a photographing optical system, and a diaphragm, including determining an appropriate exposure based on the photometering measurement of the photometer to thereby set a control diaphragm value; and correcting an exposure so that the appropriate exposure is obtained in accordance with the quantity of light transmitted through the optical element which is moved in accordance with the set the control diaphragm value.

In an embodiment, an exposure correcting method is provided, for a photographing apparatus having a photometer and a zoom lens having an optical element whose transmittance varies depending on the position at which light is transmitted therethrough, provided in a photographing optical system, including correcting an exposure in accordance with a quantity of light transmitted through the optical element which is moved in accordance with a change in a focal length of the zoom lens.

In an embodiment, an exposure correcting method is provided, for a photographing apparatus having a photometer, and a zoom lens having an optical element whose transmittance varies depending on the position at which light is transmitted therethrough, provided in a photographing optical system, including correcting an exposure so that an appropriate exposure is obtained in accordance with a quantity of light transmitted through the optical element which is moved in accordance with the control diaphragm value set based on a photometering measurement of the photometer, and the quantity of light transmitted through the optical element which is moved in accordance with a change in a focal length of the zoom lens.

According to the present invention, since the light-quantity ratio varying optical element is provided so that the distance therefrom to the diaphragm/shutter, provided in the light path, varies during the zooming operation of the zoom optical system, the image surface illuminance can be made uniform regardless of the zooming operation.

The light-quantity ratio varying optical element has a transmittance which is increased from the center in a radial direction perpendicular to the optical axis, wherein upon zooming toward the long focal length side, the light-quantity ratio varying optical element is moved to a position close to the diaphragm/shutter, and upon zooming toward the short focal length side, the light-quantity ratio varying optical element is moved to a position far away from the diaphragm/shutter. As mentioned above, since the light-quantity ratio varying optical element is moved between the positions close and far away from the diaphragm/shutter in association with the zooming operation, the peripheral image light bundle is transmitted through the peripheral area of the light-quantity ratio varying optical element at the short focal length and through the area including the paraxial area of the light-quantity ratio varying optical element at the long focal length, respectively. Accordingly, a difference in the quantity of light between the image surface center portion and the image surface edge portion can be reduced throughout focal length from the long focal length to the short focal length.

According to another aspect of the present invention, if the optical element having a variable transmittance which varies depending on the portions of the optical element at which light is transmitted is provided, an appropriate exposure can be obtained regardless of the control diaphragm value because the exposure which varies in accordance with the diaphragm value upon photometering and the control diaphragm value upon exposure is corrected by a predetermined correction value.

According to another aspect of the present invention, since a difference between the appropriate exposure obtained by the photometering operation and the actual exposure, caused by a change in the focal length, is corrected in accordance with the correction value preset in accordance with the focal length, an optimum exposure can be obtained regardless of a change in the focal length.

The present disclosure relates to subject matter contained in Japanese Patent Applications No. 2005-13327 (filed on Jan. 20, 2005) and 2005-169787 (filed on Jun. 9, 2005) which are expressly incorporated herein by reference in their entirety.

BRIEF DESCRIPTION OF THE DRAWINGS

The present invention will be described below in detail with reference to the accompanying drawings in which.

DESCRIPTION OF THE PREFERRED EMBODIMENT

Figures 1A, 1B:
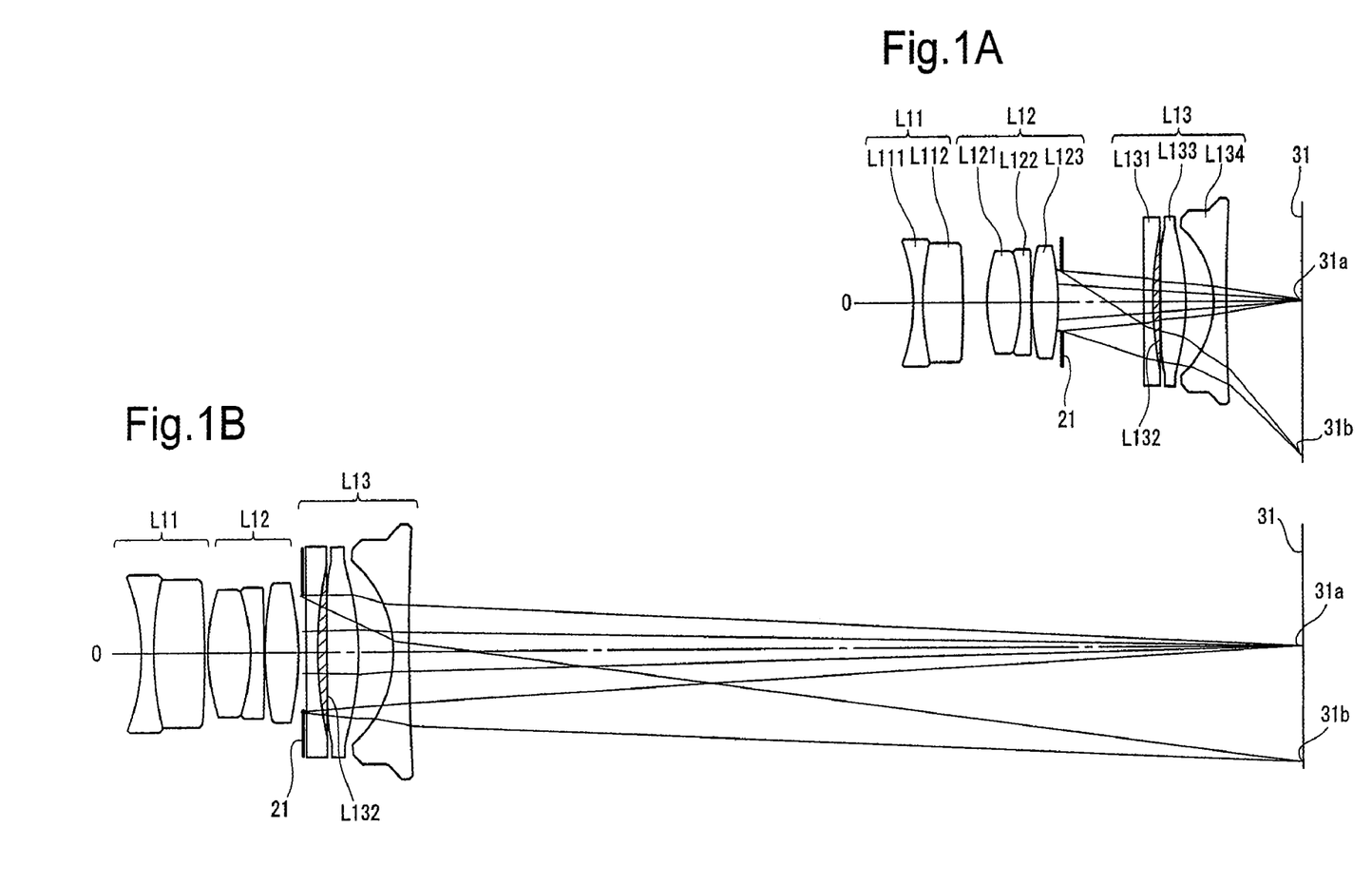
FIGS. 1A and 1B show a longitudinal sectional view of a three-lens group zoom lens having a transmittance-varying optical element, according to an embodiment of the present invention, taken along an optical axis at the wide-angle extremity (short focal length extremity) and at the telephoto extremity (long focal length extremity), respectively.

A first embodiment of a transmittance-varying optical element having a transmittance which varies depending on the position at which light is transmitted therethrough, and a photographing lens including such a transmittance-varying optical element will be explained below. FIG. 1 shows a longitudinal sectional view of a three-group zoom lens system (variable power optical system) having a transmittance-varying optical element, taken along the optical axis. FIG. 1A shows a lens arrangement of the zoom lens at the wide-angle extremity (short focal length extremity) and FIG. 1B shows a lens arrangement of the zoom lens at the telephoto extremity (long focal length extremity). The zoom lens can be applied either to an interchangeable lens for an interchangeable lens camera or to a camera with permanently attached lens (compact camera).

The zoom lens includes a negative first lens group L11 constructed from a cemented lens having a negative lens element L111 and a positive lens element L112, a positive second lens group L12 constructed from a cemented positive lens having a positive lens element L121 and a negative lens element L122, and a positive lens element L123, and a negative third lens group L13 constructed from a negative lens element L131, a positive transmittance-varying lens element (transmittance-varying optical element/filter/correction filter lens) L132, a positive lens element L133 and a negative lens element L134, arranged in that order from the object side.

In the first embodiment, a diaphragm (lens shutter) 21 is located behind (on the image side) the rearmost positive lens element L123 of the second lens group L12. The diaphragm 21 is provided with a plurality of blades so that, upon releasing, the diaphragm is stopped-down manually or automatically to a diaphragm value set by an automatic diaphragm device (not shown).

The transmittance-varying lens element L132 of the third lens group L13, which is cemented to the negative lens L131, has a transmittance density that gradually reduces (i.e., the transmittance of the visible light gradually increases) in the radially outward direction perpendicular to the optical axis O.

In FIG. 1, the hatched area represents the transmittance-varying lens element L132, in which the transmittance density is radially and gradually decreased from the center. Namely, the transmittance of the light incident upon the paraxial area of the transmittance-varying lens element L132 is low, and the transmittance of the light incident upon the peripheral area is high. It is desirable for the transmittance density (transmittance) of the transmittance-varying lens element L132 to be continuously reduced in the radial direction from the center of the transmittance-varying lens element L132, however, the transmittance density can be alternatively reduced stepwise or concentrically.

In the zoom lens of the first embodiment, the second lens group L12 having the diaphragm 21 and the third lens group LL13 having the transmittance-varying lens element L132 are moved along different zoom paths during zooming. The distance between the diaphragm 21 and the transmittance-varying lens element L132 is smallest at the wide-angle extremity (short focal length extremity) (FIG. 1A) and largest at the telephoto extremity (long focal length extremity) (FIG. 1B).

At the wide-angle extremity of the zoom lens, the light which forms a central image 31a on the image surface 31 passes through the paraxial area of the transmittance-varying lens element L132, at which the transmittance is low, and the light which forms the peripheral image 31b on the image surface 31 passes through the peripheral area of the transmittance-varying lens element L132, at which the transmittance is high. On the other hand, at the telephoto extremity, not only does the light which forms the central image 31a on the image surface 31 pass through the paraxial area of the transmittance-varying lens element L132, the light which forms the peripheral image 31b on the image surface 31 also passes through the paraxial area of the transmittance-varying lens element L132. Accordingly, in the zoom lens of the first embodiment, the distance between the transmittance-varying lens element L132 and the diaphragm 21 is varied during zooming so that the quantity of the peripheral image light transmitted through the peripheral area of the transmittance-varying lens element L132, having a high transmittance, increases as the zoom lens moves toward the wide-angle extremity.

In the zoom lens of the first embodiment, the light bundle forming the central image 31a is transmitted through the low transmittance area of the transmittance-varying lens element L132 regardless of whether the zoom lens is at the wide-angle extremity or the telephoto extremity. On the other hand, the quantity of the light bundle forming the peripheral image 31b increases toward the wide-angle extremity when transmitted through the high transmittance area of the transmittance-varying lens element L132, and the quantity of the light bundle forming the peripheral image 31b increases toward the telephoto extremity when transmitted through the paraxial area having a low transmittance. Consequently, the peripheral light amount is corrected in accordance with the change in focal length during zooming from the wide-angle extremity to the telephoto extremity.

Figure 2:
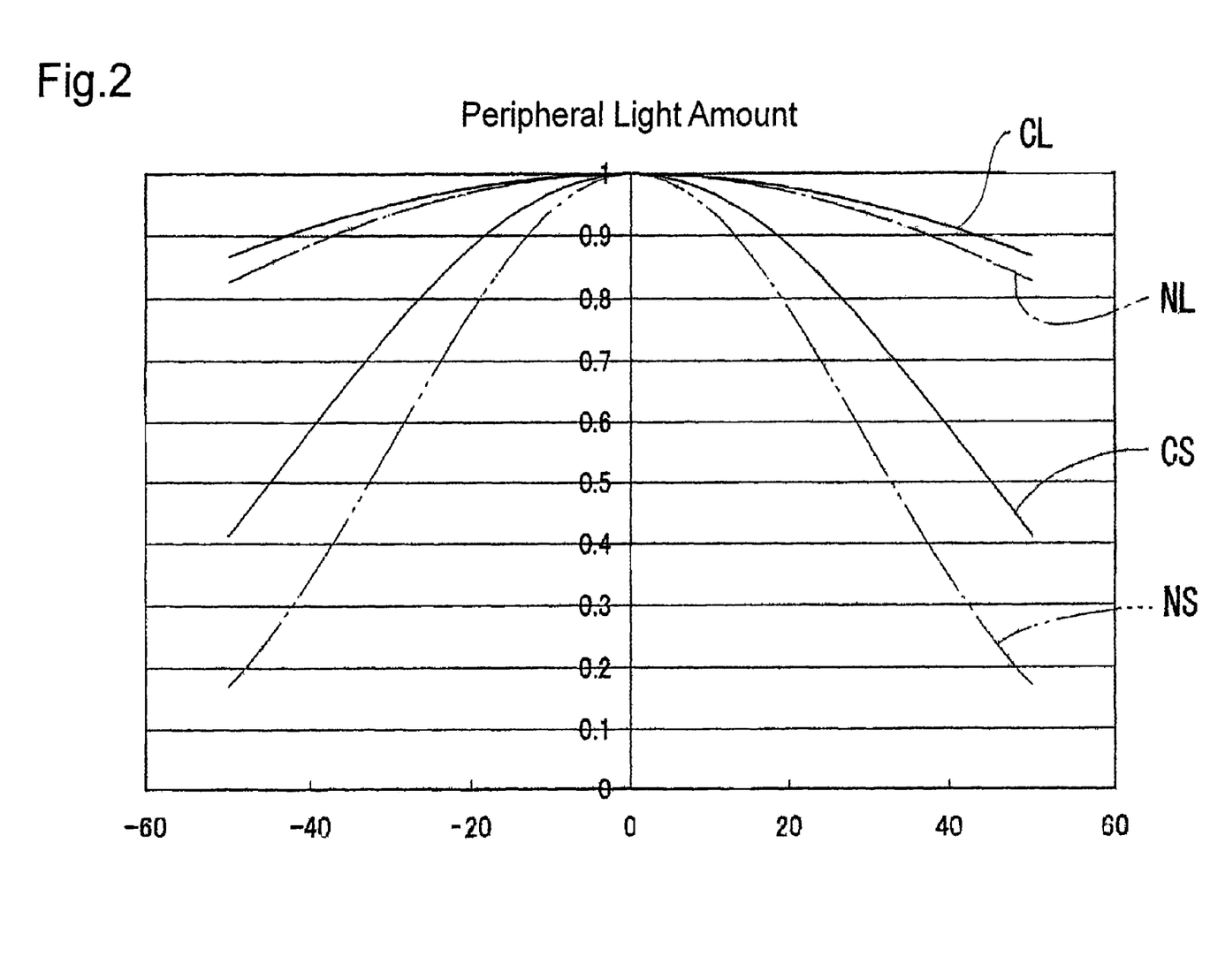
FIG. 2 is a graph showing the quantity of central light and the quantity of peripheral light in a zoom lens shown in FIG. 1.

FIG. 2 shows a graph of the characteristics of the peripheral light amount which passes through the transmittance-varying lens element L132 when the diaphragm 21 is in an open state. In FIG. 2, the ordinate represents the light-quantity ratio of the imaging surface and the abscissa represents the distance from the optical axis, and the central vertical line represents the position of the optical axis. In comparison with the telephoto and wide-angle extremity peripheral light-amount characteristic lines NL and NS in the case where the transmittance-varying lens element L132 is not used, and the telephoto and wide-angle-extremity peripheral light-amount characteristic lines CL and CS in the case of the present invention, the peripheral light amount is increased at both the wide-angle extremity and the telephoto extremity and the reduction of the peripheral light amount is restricted in the present invention, due to the presence of the transmittance-varying lens element L132.

As can be understood from the above description, in the zoom lens of the present invention, the amount of correction of the peripheral light amount changes in accordance with the focal length upon zooming from the wide-angle extremity to the telephoto extremity, so that a change in a difference (light amount difference) of the light amount in the paraxial area and the peripheral area is restricted.

Figure 3A:
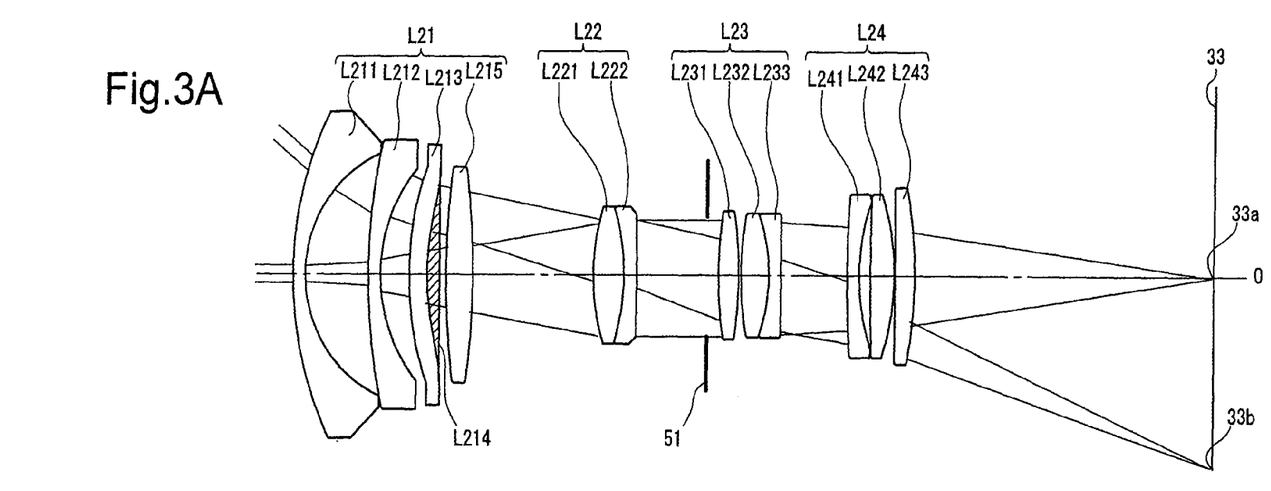
FIGS. 3A and 3B show a lens structure of a zoom lens according to a second embodiment of the present invention at the wide-angle extremity and the telephoto extremity, respectively.
Figure 3B:
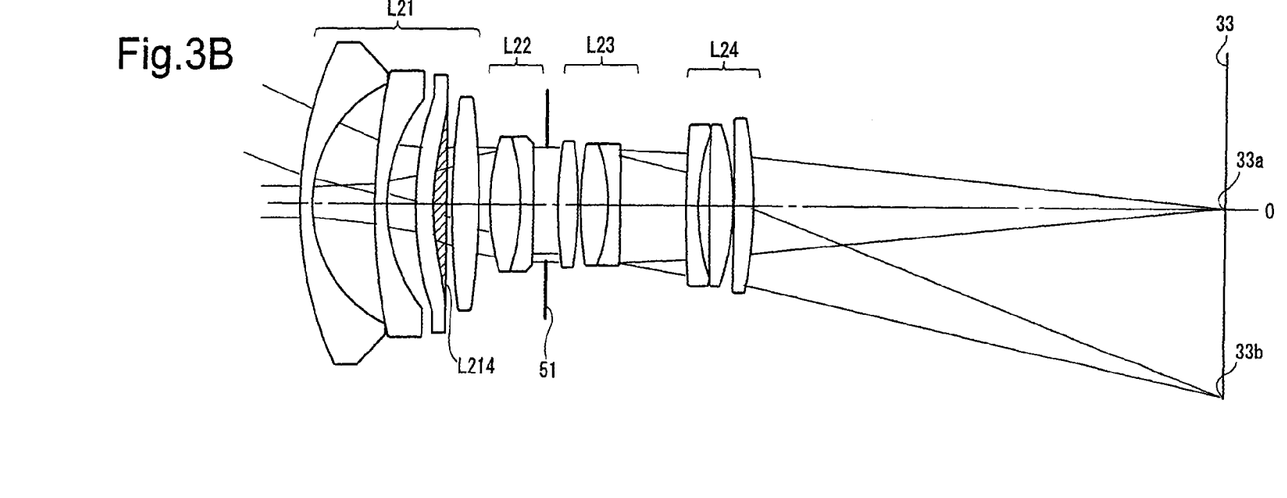

FIG. 3 shows a second embodiment of the present invention in which a transmittance-varying lens element (filter/correction filter lens) L214 (corresponding to the transmittance-varying lens element L132 of the first embodiment) is provided closer to the object side than the diaphragm (lens shutter) 51. The zoom lens is a four-lens group zoom lens which includes a negative first lens group L21 having a negative lens element L211, a negative lens element L212, a negative lens element L213, a positive transmittance-varying lens element L214 and a positive lens element L215, a positive second lens group L22 which is constructed from a cemented lens having a positive lens element L221 and a negative lens element L222, a positive third lens group L23 which is constructed from a positive lens element L231 and a cemented lens having a positive lens element L232 and a negative lens element L233, and a positive fourth lens group L24 which is constructed from a negative lens element L241, a positive lens element L242 and a positive lens element L243, in that order from the object side. The third lens group L23 and the fourth lens group L24 are moved together in the optical axis direction during zooming.

In the zoom lens of the second embodiment, the transmittance-varying lens element L214 is provided between the negative lens element L213 and the positive lens element L215 of the first lens group L21 and is cemented to the negative lens element L213. The diaphragm 51 is provided in front of the frontmost positive lens element L231 of the third lens group L23. The transmittance-varying lens element L214 is moved together with the first lens group L21 and the diaphragm 51 is moved together with the third lens group L23.

In the zoom lens of the second embodiment, the first lens group L21 and the third lens group L23 are moved away from one another at the wide-angle extremity (short focal length extremity) and are moved closest to each other at the telephoto extremity (long focal length extremity). Therefore, the transmittance-varying lens element L214 and the diaphragm 51 are located away from one another at the wide-angle extremity and closest to each other at the telephoto extremity. At the wide-angle extremity, the light bundle forming the central image 33a on the image surface 33 is transmitted through the paraxial area whose center is located on the optical axis O of the transmittance-varying lens element L214 and the light bundle forming the peripheral image 33b of the image surface 33 is transmitted through the peripheral area outside the paraxial area (FIG. 3A). At the telephoto extremity, not only is the light bundle forming the central image 33a on the image surface 33 transmitted through the paraxial area, whose center is located on the optical axis O of the transmittance-varying lens element L214, the light bundle forming the peripheral image 33b of the image surface 33 is also transmitted through the paraxial area (FIG. 3B).

As in the first embodiment, in the second embodiment of the zoom lens, the light bundle forming the central image 33a passes through the paraxial area having a low transmittance regardless of whether the zoom lens is at the wide-angle extremity or telephoto extremity, however, the light quantity of the light bundle forming the peripheral image 33b passing through the peripheral area and having a high transmittance increases toward the wide-angle extremity, and the light quantity of the light bundle forming the central image 33a passing through the paraxial area and having a low transmittance increases toward the telephoto extremity. Consequently, the peripheral light amount is controlled in accordance with the focal length from the wide-angle extremity to the telephoto extremity, so that the change in the light quantity between the peripheral light and the central light is restricted regardless of the focal length.

Figure 4A:
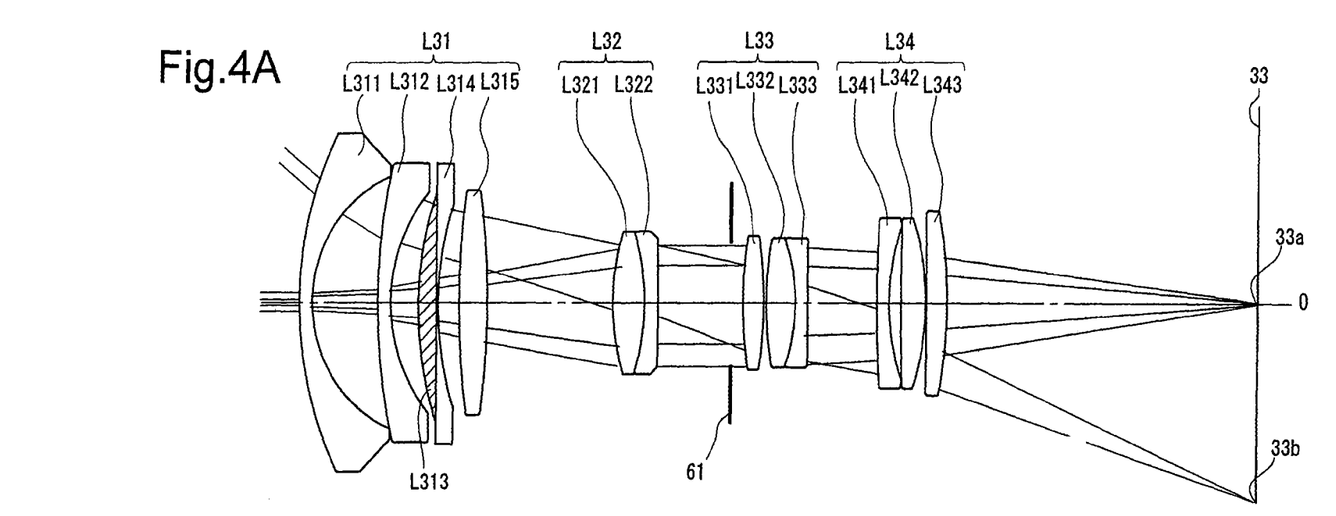
FIGS. 4A and 4B show a longitudinal sectional view of a four-lens group zoom lens having a transmittance-varying optical element, taken along an optical axis, at the wide-angle extremity (short focal length extremity) and at the telephoto extremity (long focal length extremity), respectively, according to an embodiment of the present invention.
Figure 4B:
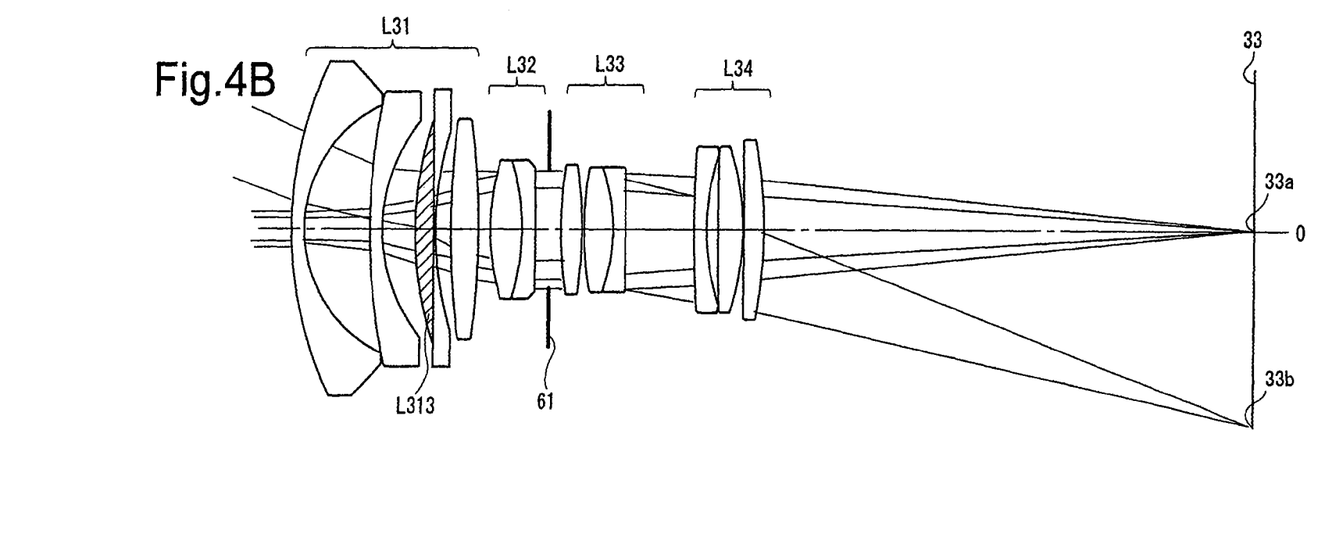

A third embodiment of the zoom lens having a transmittance-varying optical element will be discussed below with reference to FIGS. 4A and 4B. FIG. 4A shows a lens arrangement of the zoom lens at the wide-angle extremity (short focal length extremity) and FIG. 4B shows a lens arrangement of the zoom lens at the telephoto extremity (long focal length extremity). In the third embodiment, the zoom lens is a four-lens group zoom lens in which a transmittance-varying lens element (filter/correction filter lens) L313 is located closer to the object side than the diaphragm or the lens shutter. The zoom lens includes a negative first lens group L31 constructed from a negative lens element L311, a negative lens element L312, a positive transmittance-varying lens element L313, a negative lens element L314 and a positive lens element L315, a positive second lens group L32 constructed from a cemented lens of a positive lens element L321 and a negative lens element L322, a positive third lens group L33 constructed from a positive lens L331 and a cemented lens of a positive lens element L332 and a negative lens element L333, and a positive fourth lens group L34 constructed from a negative lens element L341, a positive lens element L342 and a positive lens element L343, in that order from the object side. The third lens group L33 and the fourth lens group L34 are moved together in the optical axis direction.

In the zoom lens of the third embodiment, the transmittance-varying lens element L313 is arranged between the negative lens element L312 and the negative lens element L314, of the first lens group L31. A diaphragm 61 is provided in front of the frontmost positive lens element L331 of the third lens group L33. The transmittance-varying lens element L313 is moved together with the first lens group L31 and the diaphragm 61 is moved together with the third lens group L33.

In the zoom lens of the third embodiment, the first lens group L31 and the third lens group L33 are moved away from one another at the wide-angle extremity (short focal length extremity) and are moved closest to each other at the telephoto extremity (long focal length extremity). Therefore, the transmittance-varying lens element L313 and the diaphragm 61 are located away from one another at the wide-angle extremity and closest to each other at the telephoto extremity. At the wide-angle extremity, the light bundle forming the central image 33a on the image surface 33 is transmitted through the paraxial area whose center is located on the optical axis O of the transmittance-varying lens element L313, and the light bundle forming the peripheral image 33b of the image surface 33 is transmitted through the peripheral area out of the paraxial area (FIG. 4A). At the telephoto extremity, not only is the light bundle forming the central image 33a on the image surface 33 transmitted through the paraxial area whose center is located on the optical axis O of the transmittance-varying lens element L214, the light bundle forming the peripheral image 33b of the image surface 33 is also transmitted through the paraxial area (FIG. 4B).

As in the first and second embodiments, in the third embodiment of the zoom lens, the light bundle forming the central image 33a passes through the paraxial area having a low transmittance regardless of the wide-angle extremity or telephoto extremity, however, the light quantity of the light bundle forming the peripheral image 33b passing through the peripheral area having a high transmittance is increased toward the wide-angle extremity and the light quantity of the light bundle forming the central image 33a passing through the paraxial area having a low transmittance is increased toward the telephoto extremity. Consequently, the peripheral light amount is controlled in accordance with the focal length from the wide-angle extremity to the telephoto extremity, so that a change in the light quantity between the peripheral light and the central light is restricted regardless of the focal length.

However, in the second and third embodiments, it is apparent, considering the central image forming light, that if the diaphragm 51 (61) is stopped-down, the light transmitted through the peripheral area of the transmittance-varying lens element L214 (L313) having a high transmittance is intercepted by the diaphragm 51 (61). Consequently, the relationship between the control diaphragm value of the diaphragm 51 (61) and the exposure is not linear.

The exposure correcting apparatus of the present invention is provided to correct the exposure which has been reduced by the transmittance-varying lens element. In the zoom lens of the first, second and third embodiment, the peripheral light-amount correcting effect provided by the transmittance-varying lens element L132, L214 or L313 is attenuated by stopping-down the diaphragm.

Table 1 shows a first embodiment of the exposure correction amount corresponding to the control diaphragm value suitable for the first embodiment of zoom lens in which the transmittance-varying lens L132 is arranged in the rear lens group and a large amount of eclipse is caused by the front lens frame so that the transmittance of the peripheral light is higher in the open position than in the stop-down position, focusing on the peripheral portion of the image surface, or a zoom lens in which the transmittance-varying lens element L313 is arranged in the front lens group and a large amount of eclipse is caused by the rear lens frame so that the transmittance of the peripheral light is higher in the open position than in the stop-down position. In this embodiment, the correction is carried out for the shortest focal length or shortest focal length range S and for the longest focal length or longest focal length range L.

TABLE 1

| | Correction Value [Ev] | |
|---|---|---|
| Av | S | L |
| 4 | 0.625 | — |
| 5 | 0.75 | — |
| 6 | 0.875 | — |
| 7 | 1 | 1 |
| 8 | 1 | 1 |
| 9 | — | 1 |
| 10 | — | 1 |
| 11 | — | 1 |

This embodiment corresponds to a variable f-number lens in which three changes (e.g., from Av=4 to Av=7) of the diaphragm value Av occur in the shortest focal length range S and the longest focal length range L. When the diaphragm value Av is 4, 0.625 is added to the exposure value Ev for the shortest focal length range S and 1 is added to the exposure value Ev for the longest focal length range L (L=1 corresponding to Av=7). When the diaphragm value Av is 7 or 8, 1 is added to the exposure value Av for the shortest focal length range S and the longest focal length range L. Specifically, the in the shortest focal length range S, the correction amount varies depending on the diaphragm value. Note that, in the case where a program is used to calculate the exposure value Ev, the diaphragm value Av may change when the exposure value Ev changes. In such a case, it is desirable for only the shutter speed Tv to be corrected by the amount corresponding to the correction of the exposure value Ev. According to this arrangement, no change of the diaphragm value Av takes place, and accordingly, it is not necessary to re-correct the exposure value and to perform the calculation therefor.

Table 2 shows a second embodiment of the exposure correction amount corresponding to the focal length in the case where the transmittance-varying lens element L214 or L313, having an image surface illuminance correcting filter which varies the image surface average illuminance in accordance with a change in the focal length, is cemented to the rear (image side as shown in FIGS. 3A and 3B) or the front (object side as shown in FIGS. 4A and 4B) of the negative lens element L213, respectively, assuming that the exposure value Ev is correct if there is no image surface illuminance correcting filter, and if little change in the transmittance occurs in accordance with a change in the diaphragm value. In this embodiment, the focal length is divided into four zones. S represents the shortest focal length or shortest focal length range, SM represents the intermediate short focal length range, ML represents the intermediate long focal length range, and L represents the longest focal length or longest focal length range.

TABLE 2

| | Correction Value [Ev] | | | |
|---|---|---|---|---|
| Av | S | SM | ML | L |
| 4 | 0.625 | — | — | — |
| 5 | 0.625 | 0.75 | — | — |
| 6 | 0.625 | 0.75 | 0.875 | — |
| 7 | 0.625 | 0.75 | 0.875 | 1 |
| 8 | 0.625 | 0.75 | 0.875 | 1 |
| 9 | — | 0.75 | 0.875 | 1 |
| 10 | — | — | 0.875 | 1 |
| 11 | — | — | — | 1 |

Table 3 shows the exposure correction corresponding to the diaphragm value and the focal length in the case where the quantity of light transmitted is varied by stopping-down of the diaphragm or in accordance with the focal length.

TABLE 3

| | Correction Value [Ev] | | | |
|---|---|---|---|---|
| Av | S | SM | ML | L |
| 4 | 0.625 | — | — | — |
| 5 | 0.75 | 0.75 | — | — |
| 6 | 0.875 | 0.875 | 0.75 | — |
| 7 | 1 | 1 | 0.875 | 0.75 |
| 8 | 1 | 1 | 1 | 0.875 |
| 9 | — | 1 | 1 | 1 |
| 10 | — | — | 1 | 1 |
| 11 | — | — | — | 1 |

An embodiment of an interchangeable lens type digital camera having an exposure correcting apparatus for correcting the exposure using the exposure correction tables mentioned above and an embodiment of a digital camera with a photographing lens, having an exposure correcting apparatus for correcting the exposure using the exposure correction tables mentioned above will be discussed below.

Figure 5:
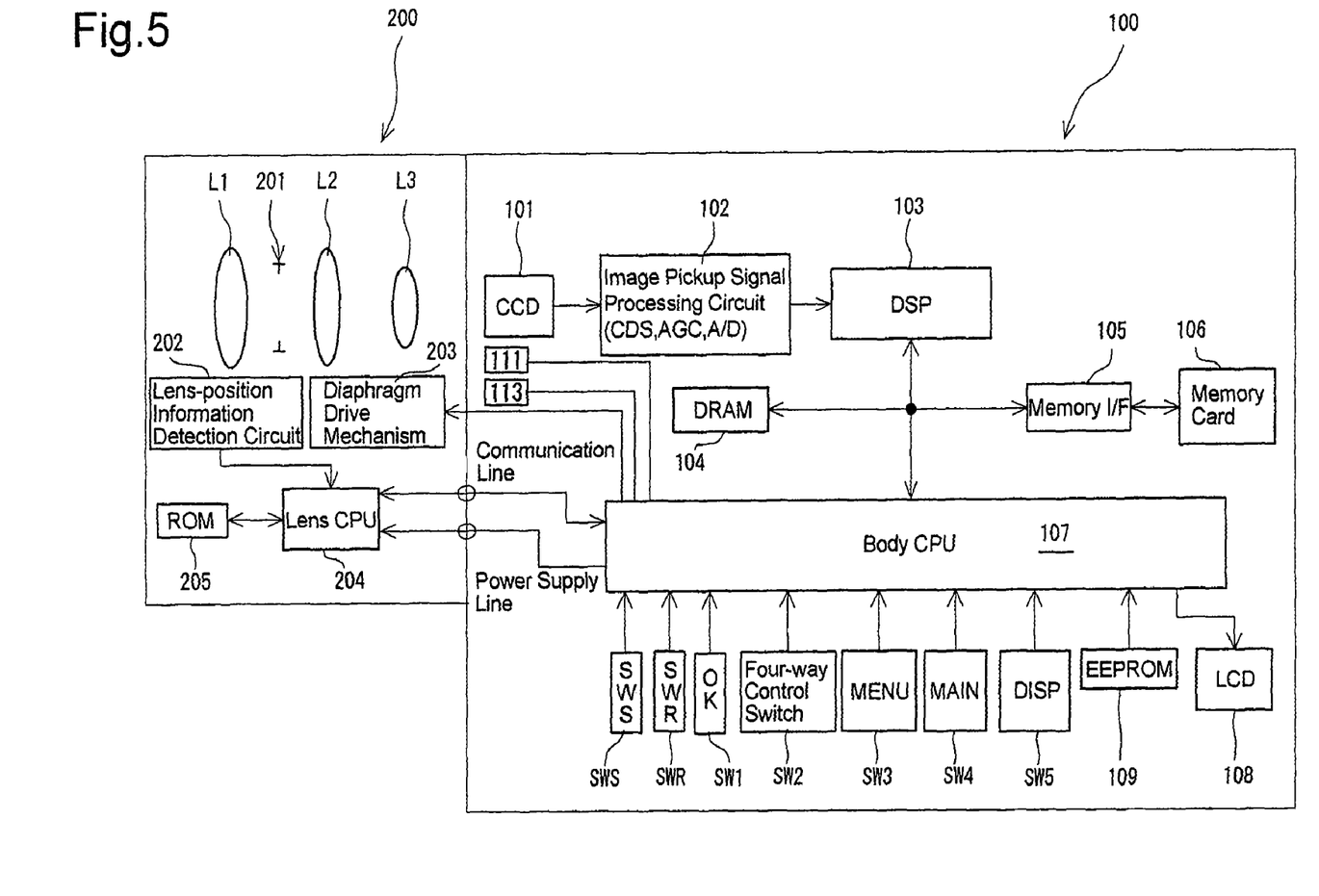
FIG. 5 is a block diagram of main components of an interchangeable lens type digital camera having an exposure correcting apparatus according to an embodiment of the present invention.

FIG. 5 shows a block diagram of main components of an embodiment of an interchangeable lens digital camera. An interchangeable lens 200 is detachably attached to a camera body 100. The interchangeable lens 200 is a three-lens group zoom lens including a first lens group L1, a diaphragm 201, a second lens group L2 and a third lens group L3. The second lens group L2 is provided with an optical element, such as a transmittance-varying lens element (L132, L214 or L313), which has a non-uniform transmittance which increases from the optical axis O toward the peripheral portion thereof. Note that the lens structure of the interchangeable lens 200 is same as that of the first and second embodiment of the zoom lens shown in FIGS. 1 and 3, respectively. The interchangeable lens 200 having such a transmittance-varying lens element will be referred to as hereinafter as a correction filter lens.

The interchangeable lens 200 is provided with a lens position information detection circuit 202 to obtain focal length and object distance information, a diaphragm drive mechanism 203, a lens CPU 204 which controls the lens information and the operation of the lenses, and a lens ROM (memory) 205 which stores therein the lens information and exposure correction data such as the exposure correction table data shown in Tables 1, 2 and 3.

The lens CPU 204 operates in response to the power supply from the camera body 100, and transmits and receives the lens information and data, and commands regarding the operation of the lenses to and from the camera body 100. The diaphragm drive mechanism 203 operates in accordance with the drive signal supplied from the camera body 100.

The camera body 100 is provided with a CCD (image pickup device) 101 to receive an object image formed by the interchangeable lens 200. The object image is photo-electrically converted to an analog signal by the CCD 101. The analog signal is successively processed in an ADC, an AGC, and an A/D converter provided in an image pickup signal processing circuit 102 which is provided in the camera body 100. This processed signal is subjected to an automatic white balance operation in a DSP 103, is converted into a predetermined format, is output as a digital image signal, such as a YUV signal or a RGB signal, and is written in a DRAM 104. Furthermore, this processed signal is also written in a removable non-volatile memory card 106 via a memory I/F 105. Furthermore, the digital image signal output from the DSP 103 is displayed in a liquid crystal display LCD 108 via a body (controller) CPU 107 which generally controls the camera functions. An EEPROM 109 which stores therein data regarding the exposure correction, etc., is connected to the body CPU 107.

The above discussion has been directed to the main components of the camera body 100 and the main image pickup functions. The camera body 100 is provided with various switches to actuate and select the functions including a photometering switch SWS, a release switch SWR, a selection OK switch SW1, a four-way control switch SW2, a menu switch (MENU) SW3, a main switch (MAIN) SW4 and a display switch (DISP) SW5.

In case of a single lens reflex camera, the camera body 100 is provided with members and functions provided in a conventional digital single lens reflex camera body such as a photometering element (photometer) 111, an AF sensor unit 113, a quick return mirror (not shown), a finder optical system (not shown), and a focal plane shutter (not shown). A battery is provided as a power source to supply power to the body CPU 107 and other electronic components.

Figure 6:
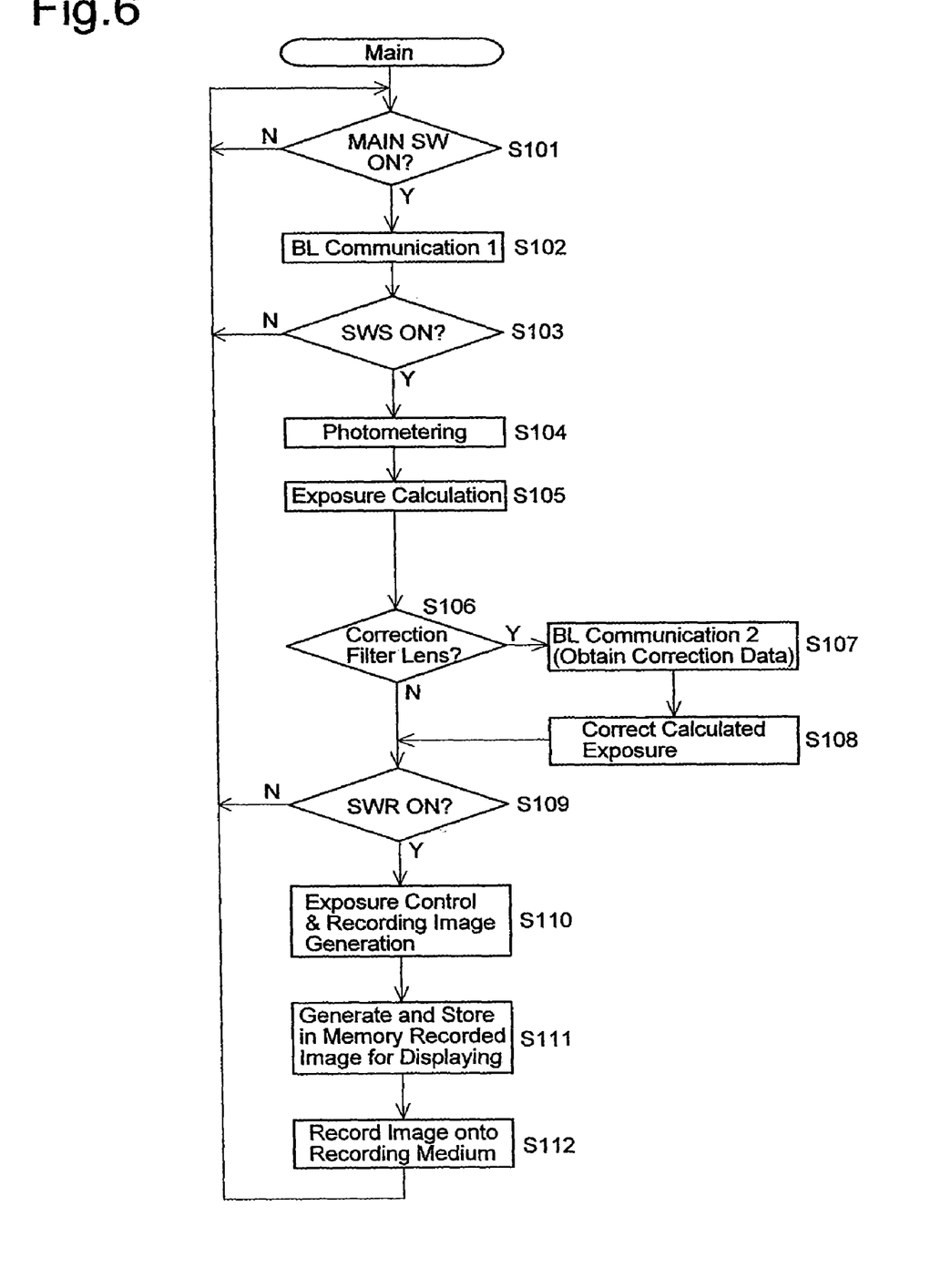
FIG. 6 is a flow chart showing a main photographing operation of a camera body of an interchangeable lens type digital camera shown in FIG. 5.
Figure 7:
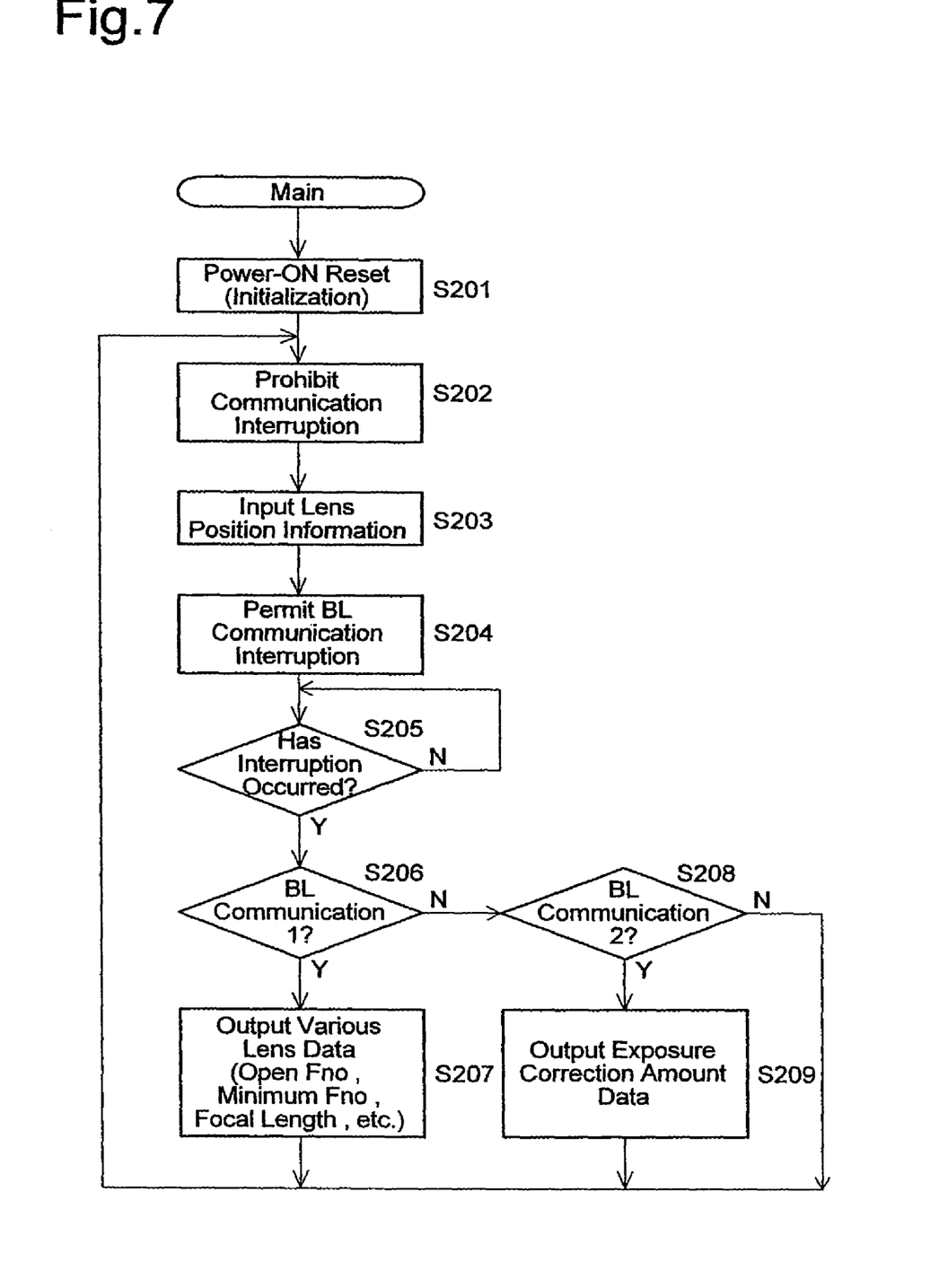
FIG. 7 is a flow chart showing a main photographing operation of an interchangeable lens of an interchangeable lens type digital camera shown in FIG. 5.

The exposure correction operation carried out when the interchangeable lens 200 and the camera body 100 perform a photographing operation will be discussed below with reference to the flow charts shown in FIGS. 6 and 7. FIG. 6 shows the operations controlled by the body CPU 107 of the camera body 100. FIG. 7 shows the operations controlled by the lens CPU 204 of the interchangeable lens 200.

The operations controlled by the body CPU 107 of the camera body 100 will be first explained with reference to FIG. 6. Upon the battery (not shown) being loaded, the body CPU 107 checks whether or not the main switch SW4 is turned ON (S101). If the main switch SW4 is not turned ON, control waits until the main switch SW4 is ON (S101, N; S101). If the main switch SW4 is turned ON (S101, Y) the operation at S102 and subsequent operations are carried out.

At step S102, power is supplied to the interchangeable lens 200 and BL (body-to-lens) communication 1 is carried out between the body CPU 107 and the lens CPU 204 of the interchangeable lens 200 to read the lens information from the lens CPU 204 (S102). The lens information includes invariable information such as whether or not a correction filter lens is being used, open f-number, and minimum f-number, and variable information such as lens position information (focal length information).

Thereafter, it is checked whether or not the photometering switch SWS is turned ON (S103). If the photometering switch SWS is not ON, control is returned to step S101. If the photometering switch SWS is turned ON (S103, Y), the photometering element 111 and the photometering circuit (not shown) are driven to perform a photometering operation to thereby input object brightness information (S104). Consequently, the diaphragm value and the shutter speed are obtained by calculation of the exposure (S105). Thereafter, it is checked whether or not a correction filter lens is being used (S106). It is determined whether or not a correction filter lens is being used based on the lens information input from the interchangeable lens 200 in the BL Communication 1 at step S102.

If a correction filter lens is being used (S106, Y) a BL Communication 2 is carried out between the body CPU 107 and the interchangeable lens 200 to receive correction data (exposure correction data) from the interchangeable lens 200 (S107). The exposure value correction operation is carried out (S108) based on the exposure correction data thus obtained. Thereafter, control proceeds to a release switch SWR checking operation (S109). In the exposure value correction operation (S108), the exposure value obtained based on the object brightness data is corrected based on the correction data, so that only the shutter speed or the shutter speed and the diaphragm value are reset based on the corrected exposure value.

In this embodiment, the exposure correction amount corresponds to the diaphragm value or focal length calculated or currently set from the table which shows the correction mount corresponding to the reduction of the correction filter stored in the lens ROM 205. In an embodiment, all the table data are read from the lens ROM 205, and in an alternative embodiment, only the data regarding the exposure correction amount corresponding to the diaphragm value and the focal length is read from the lens ROM 205. If a correction filter lens is not used (S106, N), control proceeds to the release switch SWR checking operation (S109).

At step S109, it is checked whether or not the release switch SWR is turned ON. If the release switch SWR is not ON (S109, N), control is returned to step S101. If the release switch SWR is turned ON (S109, Y), the diaphragm 201 is stopped down to the set diaphragm value by the diaphragm drive mechanism 203 and the shutter (not shown) is actuated. Thereafter, the exposure control operation in which the CCD 101 performs an image pickup operation is carried out and the image pickup signal processing circuit 102 and a DSP 303 perform a recording image generation operation (S110).

The recording image signal generated by the DSP 303 is subjected to the indicating recording image generation operation and the picked-up image is displayed in the LCD 108 and stored in the DRAM 104 (S111). Thereafter, the recording image signal stored in the DRAM 104 is recorded in the memory card 106 (S112) and control is returned top S101.

The operation of the lens CPU 204 will be explained below with reference to FIG. 7. Control enters this routine when the power is supplied from the camera body 100.

In the operation of the lens CPU 204, the lens CPU 204 performs a power-ON reset operation (initialization) at step S201. The power-ON reset operation includes reset operations of various ports and registers of the lens CPU 24. Thereafter, the communication interruption is prohibited (S202), the lens position information is input from the lens position information detector 202 (S203) BL communication interruption is permitted (S204), and control waits for the interruption of the BL communication (S205, N; S205).

Upon the BL communication being interrupted (S205, Y), it is checked whether or not the communication is the BL Communication 1 (S206). If the communication is the BL Communication 1 (S206, Y), the lens data (i.e., data on whether a correction filter lens is in use, open f-number, minimum f-number, focal length, etc.) are output (S207), and control is returned to step S202. If the communication is not the BL Communication 1 (S206, N), but the BL Communication 2 (S208, Y), the exposure correction data is output (S209), and control is returned to step S202. If the communication is neither the BL Communication 1 nor the BL Communication 2 (S208, N), control is directly returned to step S202.

As can be understood from the foregoing, according to the interchangeable lens type digital camera in which the interchangeable lens 200 is attached to the camera body 100, since an error of the exposure depending on the control diaphragm value Av and the focal length, caused by the second lens group L2 having the correction filter (transmittance-varying lens element) is corrected based on the read exposure correction data stored in the lens ROM 205 of the interchangeable lens 200, an appropriate exposure can be obtained regardless of control diaphragm value Av and the focal length.

Figure 8:
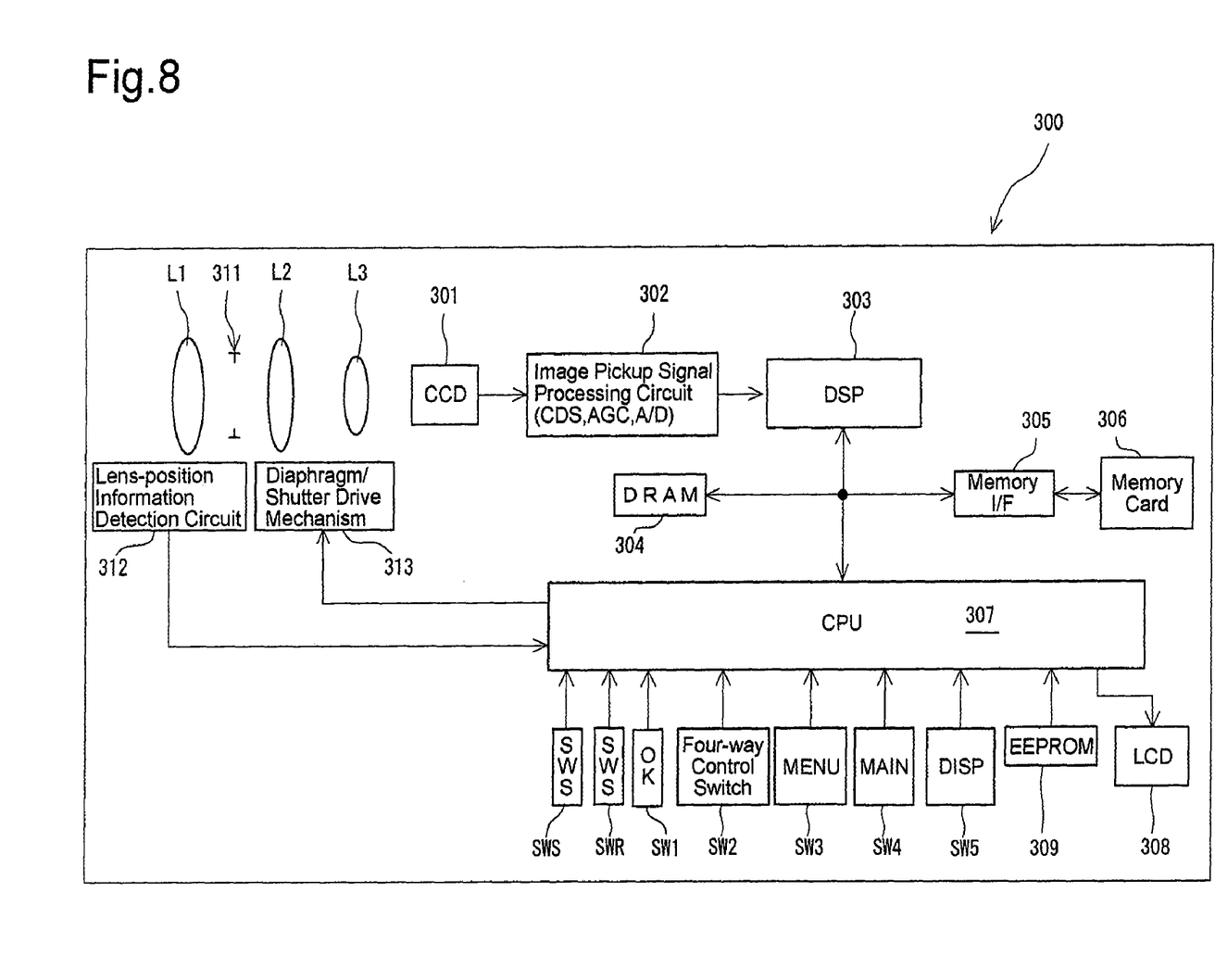
FIG. 8 is a block diagram of main components of a compact digital camera having an exposure correcting apparatus according to an embodiment of the present invention.

FIG. 8 shows a block diagram of main components of an embodiment of the invention applied to a compact digital camera 300. The compact digital camera 300 is provided with a three-lens group zoom lens (photographing lens) which includes a first lens group L1, a diaphragm/shutter 311, a second lens group L2, and a third lens group L3. The second lens group L2 is an optical element (transmittance-varying lens element) whose transmittance is increased from the optical axis O toward the peripheral portion. The compact digital camera 300 is also provided with a lens position information detection circuit 312 to obtain the focal length and object distance information, a diaphragm/shutter drive mechanism 313 to drive the diaphragm/shutter 311. The lens position information detected by the lens position information detection circuit 312 is sent to the CPU (controller) 307, so that the diaphragm/shutter drive mechanism 313 drives the diaphragm/shutter 311 in response to a drive signal from the CPU 307.

The object image formed through the first lens group L1, the diaphragm/shutter 311, and the second and third lens groups L2 and L3 is received by a CCD (image pickup device) 301. The analog signal of the object image obtained by the photoelectric conversion of the object image in the CCD 301 is successively processed by the an ADC, an AGC, and an A/D converter provided in the pickup image signal processing circuit 302, is subjected to an auto white balance operation in a DSP 303, is converted into a predetermined format, and is output as a digital image signal, e.g., as an RGB signal. This signal is written in a DRAM 304 and is written in a removable non-volatile memory card 306 via a memory I/F 305. The digital image signal output from the DSP 303 is displayed in an LCD 308 via the CPU 307, which generally controls the camera functions. An EEPROM 309, in which the data regarding the exposure correction such as exposure correction table data shown in Table 1, 2 or 3 is stored, is connected to the CPU 307.

The above description has been addressed to the main components and main functions of the compact digital camera 300. The compact digital camera 300 is provided with various switches to actuate and select the functions including a photometering switch SWS, a release switch SWR, a selection OK switch SW1, a four-way key switch SW2, a menu switch (MENU) SW3, a main switch (MAIN) SW4 and a display switch (DISP) SW5.

The compact digital camera 300 is provided with members and functions provided in a conventional digital camera, i.e., the CPU 307 carries out imaging by the CCD 301, detects a contrast of the object image from an image signal input via the DSP 103 and adjusts the focal length of the photographing lens, and furthermore, carries out a photometering function based on the image signal. The CCD 301 also constitutes a photometering element (photometer) and an AF unit. In an alternative embodiment, the compact digital camera 300 can include a photometering element (photometer) or an AF unit, separate from the CCD 301. A battery is provided as a power source to supply power to the compact digital camera 300 to actuate the CPU 307 and other electronic components provided therein.

Figure 9:
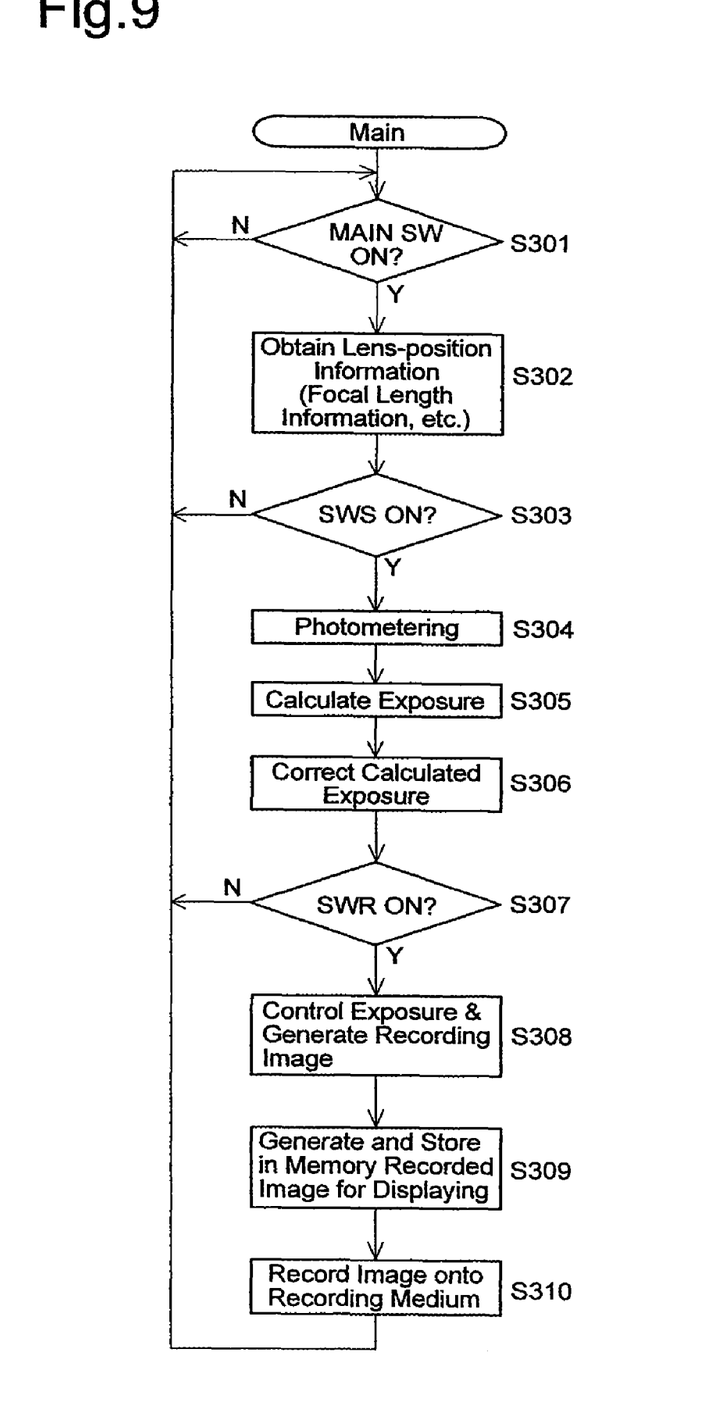
FIG. 9 is a flow chart showing a main photographing operation of a compact digital camera shown in FIG. 8.

The photographing operation and other operations of the compact digital camera 300 will be discussed below with reference to the flow chart shown in FIG. 9. The control enters this routine when the battery (not shown) is loaded into the compact digital camera 300. The CPU 307 checks whether or not the main switch SW4 is turned ON (S301). If the main switch SW4 is not turned ON, control waits until the main switch SW4 is ON (S301, N; S301). If the main switch SW4 is turned ON (S301, Y), the operation at S302 and the subsequent operations are carried out.

At step S302, the lens position information (focal length information) is obtained by the lens position information detection circuit 312. Whether or not the photometering switch SWS is turned ON is checked (S303). If the photometering switch SWS is not ON, control is returned to S301. If the photometering switch SWS is turned ON (S303, Y), the photometering operation is performed based on the image signal attained by the CCD 301 (S304) Consequently, the diaphragm value and the shutter speed are obtained by calculation of the exposure (S305).

The exposure correction amount corresponding to the focal length information obtained and the set diaphragm value is read from the EEPROM 309 to correct the exposure (S306). It is desirable that the exposure be corrected by changing the shutter speed without changing the diaphragm value.

Thereafter it is checked whether or not the release switch SWR is turned ON (S307). If the release switch SWR is not ON (S307, N), control is returned to step S301. If the release switch SWR is turned ON (S307, Y), the diaphragm/shutter drive mechanism 313 drives the diaphragm and the shutter at the shutter speed and the diaphragm value determined by calculation, so that the shutter operates. The diaphragm/shutter 311 is maintained at the set diaphragm value. The exposure control operation in which the CCD 301 performs the image pickup operation and the recording image generation operation of the picked-up image signal processing circuit 302 and DSP 303 are carried out (S308). The recording image signal generated by the DSP 303 is subjected to the indicating recording image generation operation and the picked-up image is displayed in the LCD 308 and stored in the DRAM 304 (S309) Furthermore, the recording image signal stored in the DRAM 304 is recorded in the memory card 306 (S310), and control is returned to step S301.

As can be understood from the foregoing, since an error of the exposure depending on the control diaphragm value Av and the focal length, caused by the second lens group L2 having the correction filter, is corrected based on the read exposure correction data stored in the lens EEPROM 309, the appropriate exposure can be obtained regardless of the control diaphragm value Av and the focal length.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An exposure correcting apparatus for a photographing apparatus comprising:
   a photometer;
   an optical element whose transmittance varies depending on the position at which light is transmitted therethrough, provided in a photographing optical system;
   a diaphragm; and
   a controller that corrects an exposure;
   wherein said controller determines an appropriate exposure based on a photometering measurement of said photometer to set a control diaphragm value, wherein the appropriate exposure is obtained in accordance with the quantity of light transmitted through said optical element which is moved in accordance with the set control diaphragm value, and
   wherein an amount of exposure correction corresponding to said control diaphragm value is predetermined and stored in a memory.

2. The exposure correcting apparatus according to claim 1, wherein said photographing apparatus is provided in a camera body having a detachable photographing lens, and the memory is provided in the photographing lens.

3. The exposure correcting apparatus according to claim 1, wherein an amount of exposure correction corresponding to a focal length of said photographing optical system is predetermined and stored in the memory.

4. The exposure correcting apparatus according to claim 1, wherein when the exposure is corrected, a shutter speed is controlled without correcting said control diaphragm value.

5. The exposure correcting apparatus according to claim 1, wherein said photographing optical system comprises a variable power optical system in which the optical power thereof can be varied, and wherein said optical element comprises a light-quantity ratio varying optical element whose transmittance varies in a direction perpendicular to an optical axis of said variable power optical system, said light-quantity ratio varying optical element being located in the light path of said variable power optical system and varies a distance from a diaphragm or a shutter which is moved along the optical axis in accordance with the power varying operation.

6. An exposure correcting apparatus for a photographing apparatus comprising:
   a zoom lens with an optical element whose transmittance varies depending on the position at which light is transmitted therethrough; and
   a controller for correcting an exposure in accordance with a quality of light transmitted through said optical element which is moved in accordance with a change in a focal length of said zoom lens,
   wherein an amount of exposure correction corresponding to the focal length is predetermined and stored in a memory.

7. The exposure correcting apparatus according to claim 6, wherein said photographing apparatus is provided in a camera body to which said zoom lens is detachably attached, and the memory is provided in said zoom lens.

8. The exposure correcting apparatus according to claim 6, wherein the zoom lens comprises a variable power optical system in which the optical power can be varied by changing a relative position of a plurality of optical elements;
   wherein said optical element comprises a light-quantity ratio varying optical element whose transmittance varies in a direction perpendicular to an optical axis of the variable power optical system, said light-quantity ratio varying optical element being located in an optical element which is provided in the light path of said variable power optical system and which varies a distance from a diaphragm or a shutter which is moved along the optical axis in accordance with the power varying operation.

9. An exposure correcting apparatus for a photographing apparatus comprising:
   a photometer;
   a zoom lens having an optical element whose transmittance varies depending on the position at which light is transmitted therethrough, provided in a photographing optical system of said photographing apparatus; and
   a controller for correcting an exposure so that an appropriate exposure is obtained in accordance with a quantity of light transmitted through said optical element which is moved in accordance with a control diaphragm value set based on a photometering measurement by said photometer and the quantity of light transmitted through said optical element which is moved in accordance with a change in a focal length of said zoom lens,
   wherein said photographing apparatus is provided in a camera body to which said zoom lens is detachably attached, and wherein an amount of exposure correction corresponding to the focal length and an amount of exposure correction corresponding to the control diaphragm value are predetermined and stored in a memory provided in said zoom lens.

* * * * *